US011032171B2

(12) United States Patent
Simon

(10) Patent No.: US 11,032,171 B2
(45) Date of Patent: Jun. 8, 2021

(54) ROUTER OF A DOMESTIC NETWORK, SUPERVISION INTERFACE AND METHOD FOR SUPERVISING THE USE OF A DOMESTIC NETWORK

(71) Applicant: Orange, Paris (FR)

(72) Inventor: Pierre-Henri Simon, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/061,182

(22) PCT Filed: Nov. 29, 2016

(86) PCT No.: PCT/FR2016/053130
§ 371 (c)(1),
(2) Date: Jun. 11, 2018

(87) PCT Pub. No.: WO2017/098112
PCT Pub. Date: Jun. 15, 2017

(65) Prior Publication Data
US 2018/0367424 A1 Dec. 20, 2018

(30) Foreign Application Priority Data

Dec. 11, 2015 (FR) ...................... 1562227

(51) Int. Cl.
*H04L 12/26* (2006.01)
*H04L 12/801* (2013.01)
*H04L 12/28* (2006.01)
*H04L 12/851* (2013.01)

(52) U.S. Cl.
CPC ........ *H04L 43/067* (2013.01); *H04L 12/2834* (2013.01); *H04L 43/0852* (2013.01);
(Continued)

(58) Field of Classification Search
CPC ............... H04L 43/067; H04L 12/2834; H04L 43/0852; H04L 43/0888; H04L 47/2483
See application file for complete search history.

(56) References Cited

U.S. PATENT DOCUMENTS 6,115,393 A * 9/2000 Engel .................. H04L 41/0213
370/469
7,487,290 B2 * 2/2009 Hiratsuka ............. G06F 3/0613
365/50

(Continued)

FOREIGN PATENT DOCUMENTS

EP 1381198 A1 * 1/2004 ............ H04W 88/02
EP 1381198 A1 1/2004

OTHER PUBLICATIONS

International Search Report dated Feb. 8, 2017, for corresponding International Application No. PCT/FR2016/053130, filed Nov. 29, 2016.

(Continued)

*Primary Examiner* — Uzma Alam
(74) *Attorney, Agent, or Firm* — David D. Brush; Westman, Champlin & Koehler, P.A.

(57) ABSTRACT

A router of a domestic network and a method for supervising use of a domestic network. The router is able to be connected to several communication terminals and includes a supervisor of the resources of the domestic network on the basis of real-time data of use of the resources of the domestic network by communication terminals connected to the domestic network. Thus, the router has at its disposal, at a given instant, not only overall up-going and down-going bitrates but also the share of these bitrates relating to at least one connected terminal, or indeed the share of these bitrates relating to connected terminals.

15 Claims, 4 Drawing Sheets

(52) U.S. Cl.
CPC ...... *H04L 43/0888* (2013.01); *H04L 47/2483* (2013.01); *H04L 47/10* (2013.01)

(56) References Cited

U.S. PATENT DOCUMENTS

| | | | |
|---|---|---|---|
| 9,146,927 B2 * | 9/2015 | Hirai | G06F 16/285 |
| 2003/0005130 A1 | 1/2003 | Cheng | |
| 2006/0015682 A1 * | 1/2006 | Hiratsuka | G06F 3/0674 |
| | | | 711/113 |
| 2006/0242282 A1 * | 10/2006 | Mullarkey | H04L 41/5009 |
| | | | 709/223 |
| 2008/0049777 A1 * | 2/2008 | Morrill | H04L 67/141 |
| | | | 370/420 |
| 2008/0052387 A1 * | 2/2008 | Heinz | H04L 67/22 |
| | | | 709/223 |
| 2008/0155327 A1 * | 6/2008 | Black | H04L 43/0817 |
| | | | 714/27 |
| 2010/0005170 A1 | 1/2010 | Huotari et al. | |
| 2011/0277001 A1 | 11/2011 | Kaluskar et al. | |
| 2011/0289440 A1 * | 11/2011 | Carter | H04L 43/0876 |
| | | | 715/771 |

OTHER PUBLICATIONS

Written Opinion of the International Searching Authority dated Feb. 8, 2017, for corresponding International Application No. PCT/FR2016/053130, filed Nov. 29, 2016.
English translation of the Written Opinion of the International Searching Authority dated Feb. 8, 2017, for corresponding International Application No. PCT/FR2016/053130, filed Nov. 29, 2016.

\* cited by examiner

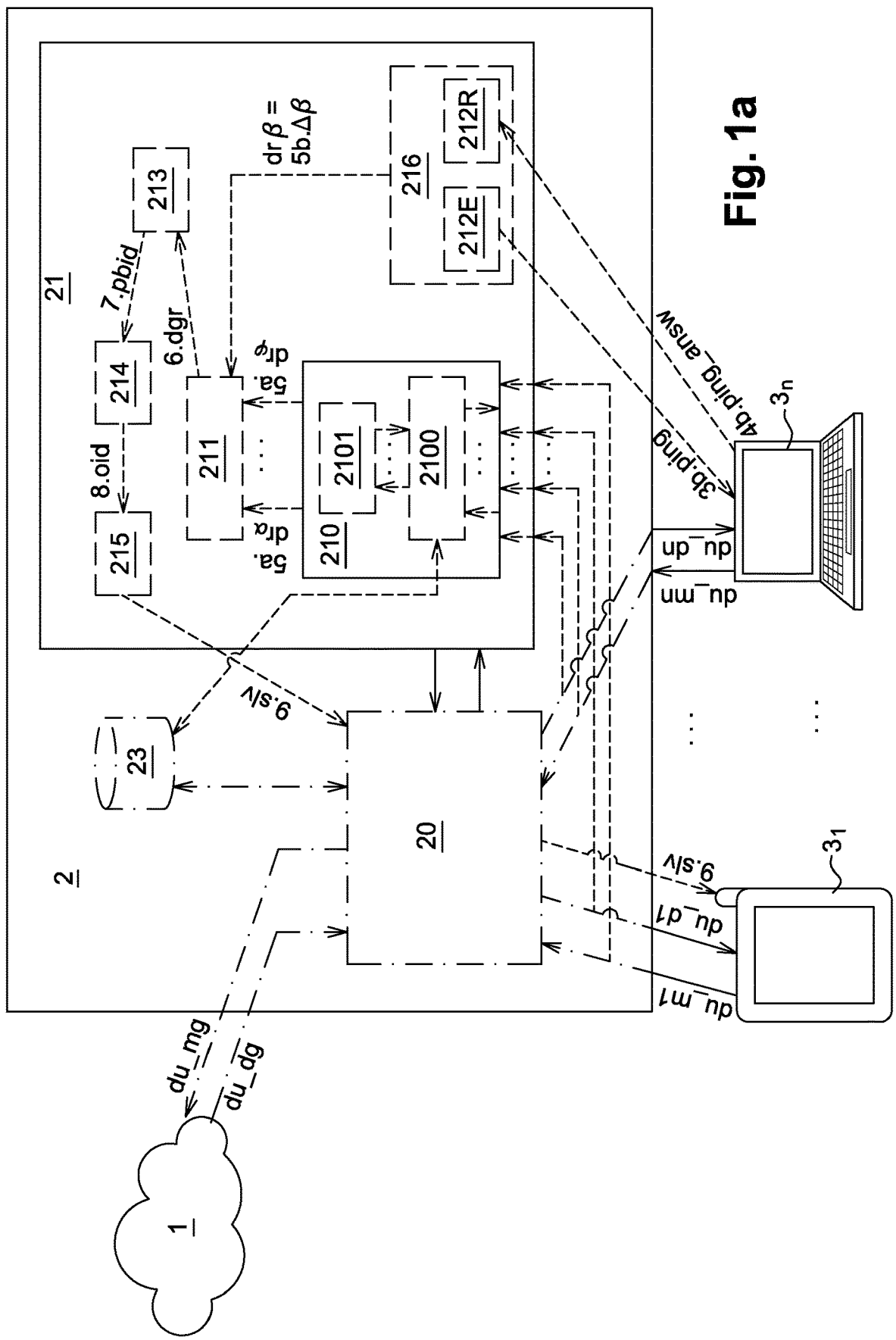

ROUTER OF A DOMESTIC NETWORK, SUPERVISION INTERFACE AND METHOD FOR SUPERVISING THE USE OF A DOMESTIC NETWORK

CROSS-REFERENCE TO RELATED APPLICATIONS

This Application is a Section 371 National Stage Application of International Application No. PCT/FR2016/053130, filed Nov. 29, 2016, the content of which is incorporated herein by reference in its entirety, and published as WO 2017/098112 on Jun. 15, 2017, not in English.

FIELD OF THE DISCLOSURE

The invention relates to a router of a domestic network and to a method for supervising the use of a domestic network.

BACKGROUND OF THE DISCLOSURE

Our domestic networks, also named local area networks, comprise a growing number of terminals that is increasing with the proliferation of types of connected terminals: connected televisions, television decoders (set-top box in English), tablets, smartphone, computers . . . . For this reason when the user of a terminal in a domestic network observes slowdowns in a process implemented by his terminal, he does not know how to determine the origin of these slowdowns.

The router, in particular the Livebox, or more generally an access router for a network of a communication network operator (xDSL, Satellite, Fibre, mobile . . . ) is able to provide the overall incoming and outgoing throughput on domestic network. Thus, the user of a terminal connected to this domestic network can obtain this information in respect of overall throughputs of the router. However, today, the router does not have available to it the share of these overall (upgoing and downgoing) throughputs that is absorbed by each terminal connected to the domestic network.

A solution would be for the user to perform on each terminal connected to the domestic network an analysis of the exchanges, and then for him to compare the results of these analyses with the overall throughput of the router. However, these operations are not only tedious, but in addition they require computing skills on the part of the user. Furthermore, the user performing the analysis of each terminal one after the other, the result is partially haphazard since the situation of the exchanges on the first terminal analyzed may have evolved when the user undertakes the analysis of the exchanges on the last terminal analyzed.

Thus, the user is most often reduced to stopping a process on a connected terminal, or indeed to disconnecting a terminal from the domestic network, thus hoping to regain for the other connected terminals a speed of the exchanges satisfactory for the processes in progress on these connected terminals. If such is not the case, he will proceed by trial and error by stopping one after another the other processes implemented by the connected terminal and/or the other connected terminals, or indeed by disconnecting the other terminals connected to the domestic network. This procedure may therefore:

be very long,
with haphazard results since the process at issue in the slowdowns having been terminated by itself, the speed of the exchanges will return to normal without any link with the operations conducted by the user,
optionally even without result since the process at issue may be a background task process that is not visible to a non-administrator user,
or indeed with a negative impact on a process in progress upon disconnection from the domestic network of the connected terminal implementing this process, or a process stopped too abruptly, etc.

SUMMARY

One of the aims of the present invention is to afford improvements with respect to the prior art.

A subject of the invention is a router of a domestic network able to be connected to several communication terminals, the router comprising a supervisor of the resources of the domestic network on the basis of real-time data of use of the resources of the domestic network by communication terminals connected to the domestic network.

Thus, the router has available to it, at a given instant, not only the overall upgoing and downgoing throughputs but also the share of these throughputs relating to at least one connected terminal, or indeed the share of these throughputs relating to connected terminals.

Advantageously, the supervisor comprises an analyzer of the frames passing through the router, the analyzer determining on the basis of the frames at least real-time data of use of the resources of the domestic network by at least one of the terminals connected to the router.

Thus, the recovery by the router of the domestic network's share of use relating to at least one connected terminal is not expensive in terms of resources for this domestic network.

Advantageously, the frames analyzer determines, for a frame passing through the router, the terminal exchanging the frame on the basis of an address contained by the frame.

Thus, the identification of the domestic network's share of use relating to at least one connected terminal is carried out with no need for significant calculation costs for the router and/or the connected terminals.

Advantageously, the frames analyzer stores on a sliding predetermined time window the real-time data of use of the resources of the domestic network by a terminal.

Thus, only the prolonged use of the resources of the domestic network triggering slowdowns such that it causes an encumbrance for the user of one of the connected terminals is detected.

Advantageously, the supervisor comprises a collector of real-time data of use of the resources of the domestic network by at least one of the terminals connected to the router, the real-time data of use of the resources by a terminal originating from the terminal.

Thus, the analyses already performed by some of the connected terminals are used by the router reducing the calculations performed by the router.

Advantageously, the router comprises a service transmitter establishing a service connection with a terminal, the service connection being triggered by a communication connection of the terminal to the router, the service connection allowing the data collector to recover the real-time data of use of the resources by the terminal.

Thus, the communications sessions already used by the processes implemented by the connected terminals are not overloaded by services data, in particular the data of use of the resources by the connected terminal.

Advantageously, the supervisor comprises a latency meter sending a signal of "ping" type destined for at least one terminal connected to the router and receiving in return the signal of "ping" type returned by the terminal allowing the meter to determine a latency of the terminal.

Thus, by simple measurement of latency, the router can rapidly determine the terminal with which the exchanges are the slowest.

Advantageously, the supervisor comprises a real-time aggregator of the real-time data of use of the resources of the domestic network by communication terminals connected to the domestic network, the aggregator being able to provide, in real time, aggregated data of use of the resources of the domestic network to at least one supervision interface implemented by one of the connected terminals.

Thus, the router proposes the set of the data of use of the resources of the domestic network per terminal allowing their comparison with one another and/or with the overall throughputs so that either the user receiving the information by way of a reproducer interface and/or the supervisor itself can detect a problem, for example transmission slowdowns in the domestic network, and optionally determine the origin thereof, that is to say the connected terminal and/or the process implemented by a connected terminal at the origin of the detected problem.

Advantageously, the supervisor comprises a problem detector for detecting a problem relating to the domestic network triggering a search engine for searching for an origin of the problem using the real-time data of use of the resources of the network by at least one of the terminals connected to the router.

Thus, the supervisor rapidly providing information relating to a nascent problem and in particular its origin will make it possible to remedy same before the latter becomes a hindrance to one or more of the connected terminals and their users.

Advantageously, the supervisor comprises a timer postponing an execution of a process by a terminal connected to the router, the process executed by the terminal having been identified by the problem origin search engine.

Thus, the supervisor rapidly providing a solution to a nascent problem it will not even have time to hinder the terminals connected to the domestic network, or their users. In particular, the timer postpone solely the execution of supposedly postponable processes.

A subject of the invention is also a supervision interface able to be implemented by at least one terminal connected to a router of a domestic network, the supervision interface comprising a generator of reproduction data dependent on real-time data provided by a supervisor of the resources of the domestic network on the basis of real-time data of use of the resources of the domestic network by at least one of the communication terminals connected to the domestic network.

A subject of the invention is also a method for supervising the use of a domestic network comprising a router able to be connected to several communication terminals, the supervision method comprises a monitoring of the resources of the domestic network on the basis of real-time data of use of the resources of the domestic network by communication terminals connected to the domestic network.

Advantageously the supervision method comprises an analysis of the frames passing through the router, the analysis determining on the basis of the frames at least real-time data of use of the resources of the domestic network by at least one of the terminals connected to the router.

Advantageously, the supervision method comprises a detection of a problem relating to the domestic network triggering a search for an origin of the problem using the real-time data of use of the resources of the domestic network by at least one of the terminals connected to the router.

Advantageously, the supervision method comprises a postponement of an execution of a process by a terminal connected to the router, the process executed by the terminal having been identified by the problem origin search engine.

Advantageously, according to an implementation of the invention, the various steps of the method according to the invention are implemented by computer software or program, this software comprising software instructions intended to be executed by a data processor of a device forming part of a router and being designed to control the execution of the various steps of this method.

The invention therefore also envisages a program comprising program code instructions for the execution of the steps of the supervision method when said program is executed by a processor.

This program can use any programming language and be in the form of source code, object code or code intermediate between source code and object code such as in a partially compiled form or in any other desirable form.

BRIEF DESCRIPTION OF THE DRAWINGS

The characteristics and advantages of the invention will become more clearly apparent on reading the description, given by way of example, and figures pertaining thereto which represent:

FIGS. 1a and 1b, simplified diagrams of a domestic network architecture comprising a router according to the invention, respectively in a centralized embodiment, and in a decentralized embodiment, FIG. 2, a simplified diagram of the supervision method according to the invention, FIG. 3, an exemplary supervision interface reproduced by one of the connected terminals.

DETAILED DESCRIPTION OF ILLUSTRATIVE EMBODIMENTS

Figure 1B:
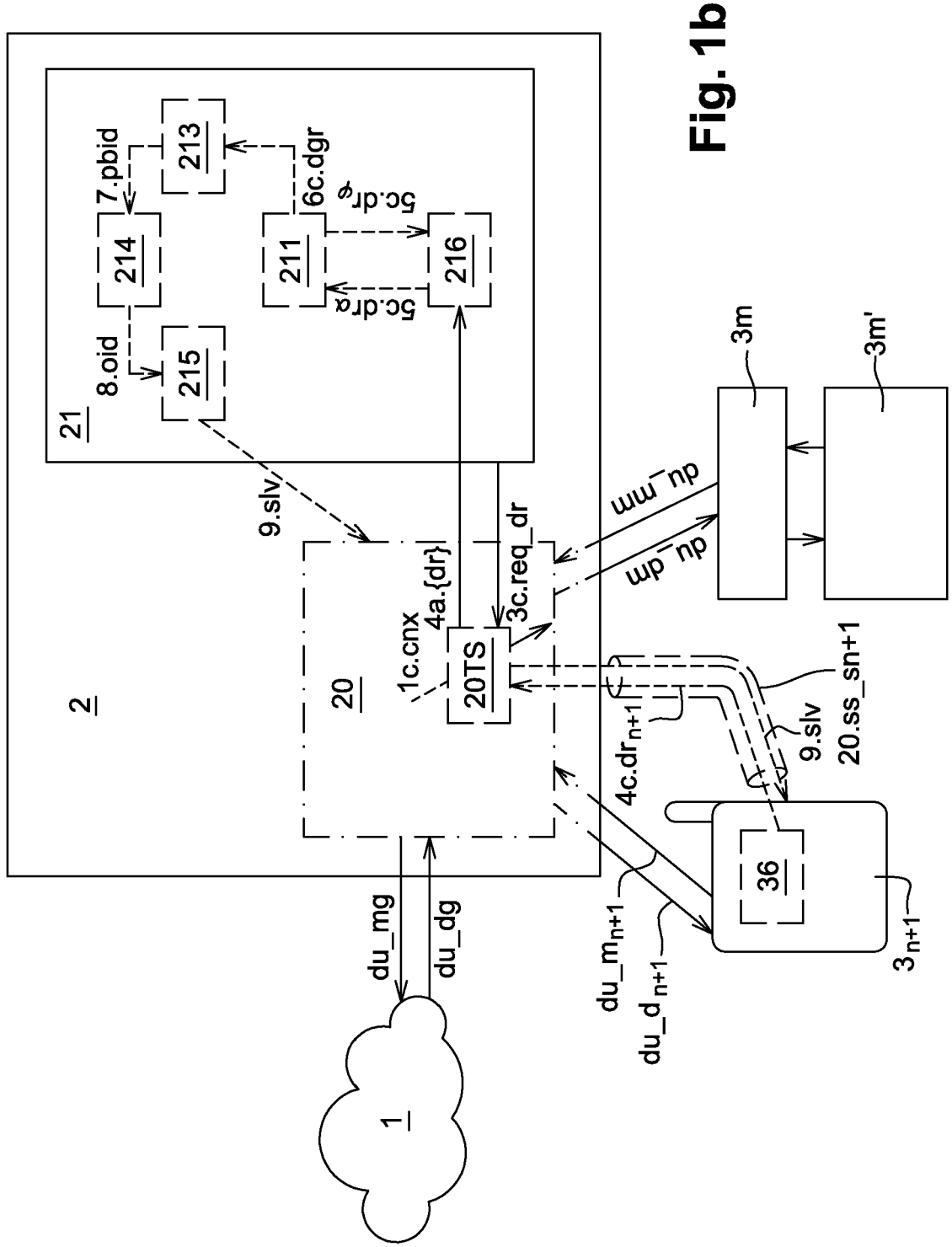

FIGS. 1a and 1b show simplified diagrams of a domestic network architecture comprising a router according to the invention, respectively in a centralized embodiment, and in a decentralized embodiment. Thus, a domestic network architecture can be embodied by implementing the invention either solely in the centralized mode, or solely in the decentralized mode, or by combining the two embodiments: for example, by using the decentralized mode for the terminals themselves undertaking an analysis of their use of the domestic resources of the network and in a centralized mode for the other terminals.

FIG. 1a illustrates a simplified diagram of a domestic network architecture comprising a router 2 according to the invention in a centralized embodiment.

The domestic network architecture comprises a router according to the invention, terminals $3_1$ to $3_n$ connected to the router 2 constituting the domestic network, and an Internet network 1. The terminals $3_1$ to $3_n$ exchange with the router 2 upgoing useful data $du\_m_1 \ldots du\_m_n$, that is to say from the terminals $3_1$ to $3_n$ to the router 2, and downgoing useful data $du\_d_1 \ldots du\_d_n$, that is to say from the router 2 to the terminals $3_1$ to $3_n$ specific to the processes implemented by each of the terminals, in particular in the form of application executed by a processor (not illustrated) of the terminal. The terminals $3_1$ to $3_n$ and the router 2 each comprise a local transmitter, in particular a local sender and a local receiver (neither illustrated), performing these exchanges on the domestic network, in particular by Ethernet and/or Wifi link . . . . In particular, the connected terminals are smartphones $3_1$, tablets, computers $3_n$ . . . .

The router 2 is, in particular, connected to a remote network such as a network Internet1 via a wired or non-wired link, in particular xDSL, Fiber, Satellite, mobile such as 4G, H+, Edge . . . . The router 2 then comprises, for example, a remote transmitter, in particular a remote sender and a remote receiver (neither illustrated), performing exchanges between the router 2 and the remote network 1 in particular of the upgoing useful data $du\_m_g$, that is to say from the remote network 1 to the router 2, and of the downgoing useful data $du\_d_g$, that is to say from the router 2 to the remote network 1. These useful data $du\_m_g$ and/or $du\_d_g$ group together, in particular, the useful data exchanged by one, several or indeed all of the connected terminals $3_1$ to $3_n$ and the router 2.

The router 2 comprises in particular a relay 20 able to read the frames of the useful data exchanged originating from the remote network 1: $du\_dg$ and/or of the connected terminals $3_1$ to $3_n$: $du\_m_1$ . . . $du\_m_n$ and to transmit them to their recipient, for example by consulting an addressing table 23.

The router 2 of a domestic network is able to be connected to several communication terminals $3_1$ to $3_n$. The router 2 comprises a supervisor 21 of the resources of the domestic network on the basis of real-time data of use of the resources $dr\alpha$ . . . $dr\mu$ of the domestic network by at least one of the communication terminals connected $3_1$ . . . $3_n$ to the domestic network.

In particular, the supervisor 21 comprises an analyzer 210 of the frames passing through the router 2. The analyzer 210 determines on the basis of the frames $du\_m_1$, $du\_d_1$ . . . $du\_m_n$, $du\_d_n$ at least real-time data of use of the resources $dr\alpha$ . . . $dr\mu$ of the domestic network by at least one of the terminals connected to the router $3_1$ . . . $3_n$.

In particular, the frames analyzer 210 determines, for a frame $du\_m_i$ or $dud_i$ passing through the router 2, the terminal $3_i$ exchanging the frame on the basis of an address contained by the frame. In particular, the frames analyzer 210 comprises a reader 2100 of address in the frames passing through the router 2 so as to determine the terminal $3_i$ exchanging a frame $du\_m_i$ or $dud_i$. The address reader 2100 optionally uses an addressing table 23 of the router 2.

In particular, the frames analyzer 210 stores on a sliding predetermined time window the real-time data of use $dri_i$ of the resources of the domestic network by a terminal $3_i$. In particular, the frames analyzer comprises a calculator 2101 storing on the sliding predetermined time window the real-time data of use $dri_i$ of the resources of the domestic network by a terminal $3_i$.

In particular, the supervisor 21 comprises a latency meter 212 sending a signal of "ping" type destined for at least one terminal $3_n$ connected to the router and receiving in return the signal of "ping" type returned by the terminal $3_n$ allowing the meter 212 to determine a latency of the terminal $\Delta\beta$. In particular, the supervisor comprises a sender 212E of "ping" signal or a generator 212E of "ping" signal using the local sender (not illustrated) of the router 2, and a receiver 212R of response to a "ping" signal or a detector 212R of response to a "ping" signal connected to the local receiver (not illustrated) of the router 2.

In the example of FIG. 1a, the sender 212E dispatches a signal $3b$. ping to at least one connected terminal $3_n$, which responds with a response signal $4b$. ping answ. The latency meter 212 then provides at least one latency signal $5b$. $\Delta\beta$ corresponding to the latency of this at least one connected terminal $3_n$.

In particular, the supervisor 21 comprises a real-time aggregator 211 of the real-time data of use of the resources $dr\alpha$ . . . $dr\mu$, $\Delta\beta$ of the domestic network by communication terminals connected $3_1$ . . . $3_n$ to the domestic network. The aggregator 211 is able to provide, in real time, aggregated data dgr of use of the resources of the domestic network to at least one supervision interface implemented by one of the connected terminals $3_1$ . . . $3_n$.

In the example of FIG. 1a, the real-time aggregator 211 receives several signals of real-time data of use of the resources, respectively $5a.dr\alpha$ . . . $5a.dr\mu$, and optionally at least one latency signal $5b$. $\Delta\beta$, and then provides an aggregated signal 6. dgr.

In particular, the supervisor 21 comprises a problem detector 213 for detecting a problem relating to the domestic network triggering a search engine for searching for an origin of the problem 214 using the real-time data of use of the resources $dr\alpha$ . . . $dr\mu$, $\Delta\beta$ of the network by at least one of the terminals $3_1$ . . . $3_n$ connected to the router.

The problem detector 213 receives either directly the real-time data of use of the resources $5a.dr\alpha$ . . . $5a.dr\mu$, and/or $5\beta.\Delta\beta$; or, as shown by FIG. 1a, the aggregated signal 6.dgr, and provides, when it detects a problem on the domestic network: transmission slowdowns, congestion of the network (that is to say a throughput used/capacity of the domestic network ratio close to 1), etc., or a nascent problem such as a slowdown of at least one transmission, a start of congestion, etc., a signal 7.pbid triggering the search engine 214. This signal 7.pbid may be a simple command of the search engine 214 and/or comprise an identifier of the problem 7.pbid, such as the address of the terminal using the most resources of the domestic network and/or the address of the terminal whose latency is the highest and/or the real-time data of corresponding use of resources (upgoing throughput and/or downgoing throughput and/or latency, etc.), etc.

The search engine 214 uses, in particular, the real-time data of use of the resources $5a.dr\alpha$ . . . $5a.dr\mu$, and/or $5\beta.\Delta\beta$ and/or the data contained in the signal 7.pbid originating from the problem detector 213. Thus, the search engine can determine whether there is a problem or whether there is more than one problem, for each problem: the type of problem, the terminal(s) posing a problem, and, optionally, the process(es) at the origin of the problem from among those implemented by the terminal(s) . . . . In FIG. 1a, the search engine provides as result an origin signal 8.oid comprising data of identifications of one or more of the elements determined hereinabove.

In particular, the supervisor 21 comprises a timer 215 postponing an execution of a process by a terminal $3_1$ . . . $3_n$ connected to the router 2. The process executed by the terminal $3_1$ . . . $3_n$ has been identified by the problem origin search engine 214.

A timer 215 receiving in particular the origin signal 8.oid will be capable of generating a command 9.slv destined for the terminal at the origin of the problem detected so as in particular to postpone one or more processes of the terminal. For example, the processes not requiring any interaction with the user are automatically postponed to a period of the day when the domestic network is generally less loaded (for example, at night) or postponements are proposed to the user of the terminal by means of a supervision interface implemented by the terminal allowing the user to choose the postponement of one or more process as a function of their influence on the loading of the domestic network and/or of their immediate interest to him (for example, a daily uploading of photos to the cloud will be of less immediate interest to the user than the streaming of data of a video game that he is playing).

Note that the supervisor 21 can supervise the whole set of connected terminals $3_1$ to $3_n$ or only some of the connected terminals. Thus, the supervisor 21 performs its process on the basis of the whole set of real-time data of use of the resources $dr_1 \ldots dr_n$ (which is not illustrated) of each of the connected terminals $3_1$ to $3_n$ or only of the real-time data of use of the resources $dr\alpha \ldots dr\mu$ of some of the connected terminals $3\alpha \ldots 3\mu$.

In particular, at least one of the connected terminals and/or the router comprises a supervision interface (not illustrated). The supervision interface comprises a generator of reproduction data dependent on real-time data provided by a supervisor of the resources of the domestic network on the basis of real-time data of use of the resources of the domestic network by at least one of the communication terminals connected to the domestic network.

The data generated comprise at least one illustration of the upgoing and/or downgoing throughputs between the router 2 and at least one of the connected terminals, and/or an illustration of the latency between the router 2 and at least one of the connected terminals, and optionally a link to or a command for triggering a timer as a function of the terminal and/or of the exchange (upgoing or downgoing) concerned in the interaction of a user with the supervision interface.

In the case where the supervision interface is implemented on the router, a reproduction interface and/or interaction interface of at least one of the connected terminals is connected to the supervision interface to reproduce and/or interact with the generated data.

FIG. 1b illustrates a simplified diagram of a domestic network architecture comprising a router according to the invention in a decentralized mode.

The domestic network architecture comprises a router according to the invention, terminals $3_{n+1}$ to $3_m$, $3_{m'}$ connected to the router 2 constituting the domestic network, and an Internet network 1. The terminals $3_{n+1}$ to $3_m$, $3_{m'}$ exchange with the router 2 upgoing useful data $du\_m_{n+1} \ldots du\_m_m$, that is to say from the terminals $3_{n+1}$ to $3_m$, $3_{m'}$ to the router 2, and downgoing useful data $du\_d_{n+1} \ldots du\_d_m$, that is to say from the router 2 to the terminals $3_{n+1}$ to $3_m$, $3_{m'}$ specific to the processes implemented by each of the terminals, in particular in the form of application executed by a processor (not illustrated) of the terminal. The terminals $3_{n+1}$ to $3_m$, $3_{m'}$ and the router 2 each comprise a local transmitter, in particular a local sender and a local receiver (neither illustrated), performing these exchanges on the domestic network, in particular by Ethernet and/or Wifi link . . . . In particular, the connected terminals are smartphones $3_{n+1}$, tablets, computers, decoders $3_m$, televisions $3_{m'}$ connected via a decoder, televisions connected directly to the domestic network . . . .

The router 2 is, in particular, connected to a remote network such as a network Internet1 via a wired or non-wired link, in particular xDSL, Fiber, Satellite, mobile such as 4G, H+, Edge . . . . The router 2 then comprises, for example, a remote transmitter, in particular a remote sender and a remote receiver (neither illustrated), performing exchanges between the router 2 and the remote network 1 in particular of the upgoing useful data $du\_m_g$, that is to say from the remote network 1 to the router 2, and of the downgoing useful data $du\_d_g$, that is to say from the router 2 to the remote network 1. These useful data $du\_m_g$ and/or $du\_d_g$ group together, in particular, the useful data exchanged by one, several or indeed all of the connected terminals $3_{n+1}$ to $3_m$, $3_{m'}$ and the router 2.

The router 2 comprises in particular a relay 20 able to read the frames of the useful data exchanged originating from the remote network 1: $du\_dg$ and/or from the connected terminals $3_{n+1}$ to $3_m$, $3_{m'}$: $du\_mn_{+1} \ldots du\_m_m$ and to transmit them to their recipient, for example by consulting an addressing table 23.

The router 2 of a domestic network 1 is able to be connected to several communication terminals $3_{n+1}$ to $3_m$, $3_{m''}$. The router 2 comprises a supervisor 21 of the resources of the domestic network on the basis of real-time data of use of the resources $dr\alpha \ldots dr\mu$ of the domestic network by at least one of the communication terminals connected $3_{n+1}$ to $3_m$, $3_{m'}$ to the domestic network.

In particular, the supervisor 21 comprises a collector 216 of real-time data of use of the resources $dr_{n+1} \ldots dr_m$ of the domestic network by at least one of the terminals connected $3_{n+1}$ to $3_m$, $3_{m'}$ to the router. The real-time data of use of the resources $dr_{n+1} \ldots dr_m$ by a terminal originate from the terminal concerned $3_{n+1} \ldots 3_m$, $3_{m''}$.

In particular, the router 2 comprises a service transmitter 20TS establishing a service connection with a terminal $3_{n+1}$. The service connection is triggered by a communication connection of the terminal $3_{n+1}$ to the router 2. The service connection allows the data collector 216 to recover the real-time data of use of the resources $dr_{n+1}$ by the terminal at the terminal concerned $3_{n+1}$.

In particular, the supervisor 21 comprises a real-time aggregator 211 of the real-time data of use of the resources $dr\alpha \ldots dr\mu$ of the domestic network by communication terminals connected $3_{n+1} \ldots 3_m$, $3_{m'}$ to the domestic network. The aggregator 211 is able to provide, in real time, aggregated data $dgr$ of use of the resources of the domestic network to at least one supervision interface implemented by one of the connected terminals $3_{n+1} \ldots 3_m$, $3_{m''}$.

In the example of FIG. 1b, the real-time aggregator 211 receives several signals of real-time data of use of the resources, respectively $5c.dr\alpha \ldots 5c.dr\mu$, and then provides an aggregated signal 6. $dgr$.

In particular, the supervisor 21 comprises a problem detector 213 for detecting a problem relating to the domestic network triggering a search engine for searching for an origin of the problem 214 using the real-time data of use of the resources $dr\alpha \ldots dr\mu$, of the networks by at least one of the terminals $3_1 \ldots 3_n$ connected to the router.

The problem detector 213 receives either directly the real-time data of use of the resources $5c.dr\alpha \ldots 5c.dr\mu$; or, as shown by FIG. 1b, the aggregated signal 6.$dgr$, and provides, when it detects a problem on the domestic network: transmission slowdowns, congestion of the network (that is to say a throughput used/capacity of the domestic network ratio close to 1), etc., or a nascent problem such as a slowdown of at least one transmission, a start of congestion, etc., a signal 7.$pbid$ triggering the search engine 214. This signal 7.$pbid$ may be a simple command of the search engine 214 and/or comprise an identifier of the problem 7.$pbid$, such as the address of the terminal using the most resources of the domestic network and/or the address of the terminal whose latency is the highest and/or the real-time data of corresponding use of resources (upgoing throughput and/or downgoing throughput and/or latency, etc.), etc.

The search engine 214 uses, in particular, the real-time data of use of the resources $5c.dr\alpha \ldots 5c.dr\mu$, and/or the data contained in the signal 7.$pbid$ originating from the problem detector 213. Thus, the search engine can determine whether there is a problem or whether there is more than one problem, for each problem: the type of problem, the terminal(s) posing a problem, and, optionally, the process(es) at the origin of the problem from among those implemented by the terminal(s) . . . . In FIG. 1b, the search engine provides as result an origin signal 8.oid comprising data of identifications of one or more of the elements determined hereinabove.

In particular, the supervisor 21 comprises a timer 215 postponing an execution of a process by a terminal $3_{n+1}$ . . . $3_m$, $3_{m'}$ connected to the router 2. The process executed by the terminal $3_{n+1}$ . . . $3_m$, $3_{m'}$ has been identified by the problem origin search engine 214.

A timer 215 receiving in particular the origin signal 8.oid will be capable of generating a command 9.slv destined for the terminal $3_{n+1}$ at the origin of the problem detected so as in particular to postpone one or more processes of the terminal.

Note that the supervisor 21 can supervise the whole set of connected terminals $3_{n+1}$ . . . $3_m$, $3_{m'}$ or only some of the connected terminals. Thus, the supervisor 21 performs its process on the basis of the whole set of real-time data of use of the resources $dr_{n+1}$ . . . $dr_m$ (which is not illustrated) of each of the connected terminals $3_{n+1}$ . . . $3_m$, $3_{m'}$ or only of the real-time data of use of the resources $dr\alpha$ . . . $dr\mu$ of some of the connected terminals $3\alpha$ . . . $3\mu$.

Figure 2:
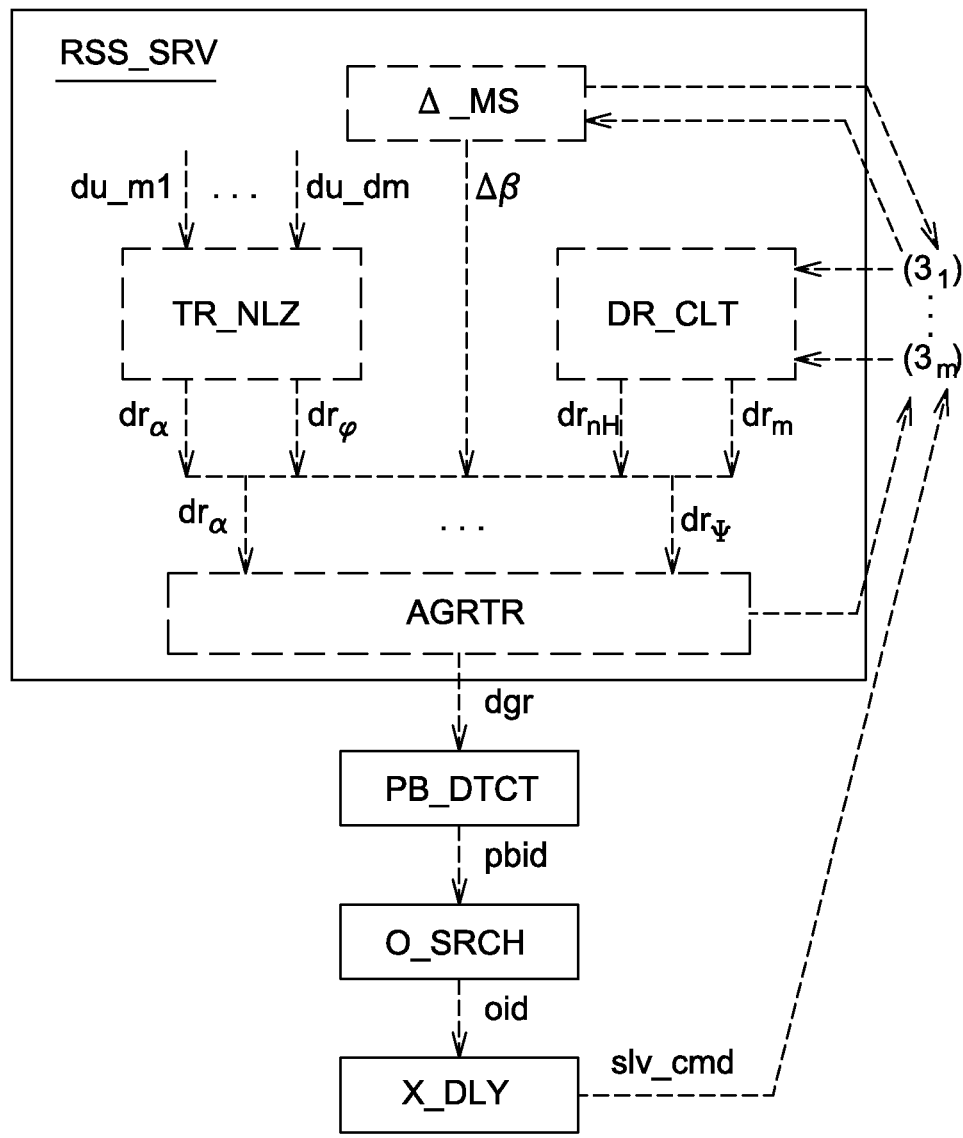

FIG. 2 illustrates a simplified diagram of the supervision method according to the invention.

The supervision method performs a supervision of the use of a domestic network comprising a router able to be connected to several communication terminals $3_1$ . . . $3_m$. The supervision method comprises a monitoring RSS_SRV of the resources of the domestic network on the basis of real-time data of use of the resources $dr\alpha$ . . . $dr\mu$ of the domestic network by communication terminals connected to the domestic network.

In particular, the supervision method comprises an analysis TR_NLZ of the frames passing through the router. The analysis of the frames TR_NLZ determines, on the basis of the frames du_m1 . . . du_dm, at least real-time data of use of the resources $dr\alpha$ . . . $dr\mu$ of the domestic network by at least one of the terminals connected $3_1$ . . . $3_m$ to the router.

In particular, the analysis of the frames TR_NLZ determines, for a frame du_m1 . . . du_dm passing through the router 2, the terminal $3_i$ exchanging the frame on the basis of an address contained by the frame. For example, the analysis of the frames TR_NLZ comprises a reading (not illustrated) of address in the frames passing through the router 2 so as to determine the terminal $3_i$ exchanging a frame du_$m_i$ or dud$_i$. The address reading optionally uses an addressing table of the router 2.

Optionally, the analysis of the frames TR_NLZ stores on a sliding predetermined time window the real-time data of use dri$_i$ of the resources of the domestic network by a terminal $3_i$. In particular, the analysis of the frames TR_NLZ comprises a storage on the sliding predetermined time window of the real-time data of use dri$_i$ of the resources of the domestic network by a terminal $3_i$.

For example, the monitoring RSS_RSV comprises an analysis of frames TR_NLZ as is illustrated by FIG. 2.

In particular, the supervision method comprises a measurement of latency Δ_MS by sending of a signal of "ping" type destined for at least one terminal $3_1$ connected to the router and receiving in return the signal of "ping" type returned by the terminal $3_1$ making it possible to determine a latency of the terminal Δβ. For example, the monitoring RSS_RSV comprises a measurement of latency Δ_MS as illustrated by FIG. 2.

In particular, the supervision method comprises a real-time aggregation AGRTR of the real-time data of use of the resources $dr\alpha$ . . . $dr\psi$, Δβ of the domestic network by communication terminals connected $3_1$ . . . $3_m$ to the domestic network. The aggregation AGRTR is able to provide, in real time, aggregated data dgr of use of the resources of the domestic network to at least one supervision interface implemented by one of the connected terminals $3_1$ . . . $3_m$.

In the example of FIG. 2, the real-time aggregation AGRTR receives several signals of real-time data of use of the resources, respectively $dr\alpha$ . . . $dr\mu$ of a frame analysis TR_NLZ, and/or $dr_{n+1}$ . . . $dr_m$ of a collection DR_CLT and, optionally, at least one latency signal Δβ of a measurement of latency Δ_MS, and then provides an aggregated signal dgr.

For example, the monitoring RSS_RSV comprises a real-time aggregation AGRTR as illustrated by FIG. 2.

In particular, the supervision method comprises a problem detection PB_DTCT for detecting a problem relating to the domestic network triggering a search for an origin of the problem O_SRCH using the real-time data of use of the resources of the network by at least one of the terminals connected to the router.

The problem detection PB_DTCT receives either directly the real-time data of use of the resources $dr\alpha$ . . . $dr\mu$ and/or $dr_{n+1}$ . . . $dr_m$ and/or Δβ; or, as shown by FIG. 2, the aggregated signal dgr, and provides, when it detects a problem on the domestic network: transmission slowdowns, congestion of the network (that is to say a throughput used/capacity of the domestic network ratio close to 1), etc., or a nascent problem such as a slowdown of at least one transmission, a start of congestion, etc., a signal pbid triggering an origin search O_SRCH. This signal pbid may be a simple command of the search O_SRCH and/or comprise an identifier of the problem, such as the address of the terminal using the most resources of the domestic network and/or the address of the terminal whose latency is the highest and/or the real-time data of corresponding use of resources (upgoing throughput and/or downgoing throughput and/or latency, etc.), etc.

The supervision method comprises an origin search O_SRCH which uses, in particular, the real-time data of use of the resources and/or the data contained in the signal originating from the problem detection PB_DTCT. In FIG. 2, the search provides as result an origin signal oid comprising data of identifications of one or more of the following elements: number of problems, for each problem: the type of problem, the terminal(s) posing a problem, and, optionally, the process(es) at the origin of the problem from among those implemented by the terminal(s) . . . .

In particular, the supervision method comprises a postponement X_DLY of an execution of a process by a terminal connected to the router, the process executed by the terminal having been identified by the problem origin search O_SRCH.

The postponement X_DLY receiving in particular the origin signal oid will be capable of generating a command s/v destined for the terminal at the origin of the problem detected so as in particular to postpone one or more processes of the terminal.

Note that the supervision method can supervise the whole set of connected terminals $3_1$ to $3_m$ or only some of the connected terminals. Thus, the supervisor 21 performs its process on the basis of the whole set of real-time data of use of the resources $dr_1 \ldots dr_m$ (which is not illustrated) of each of the connected terminals $3_1$ to $3_m$ or only of the real-time data of use of the resources $dr\alpha \ldots dr\psi$ of some of the connected terminals $3\alpha \ldots 3\mu$.

The supervision method can be carried out by means of a program comprising program code instructions for the execution of the steps of the supervision method when said program is executed by a processor, in particular a processor of the router 2.

Figure 3:
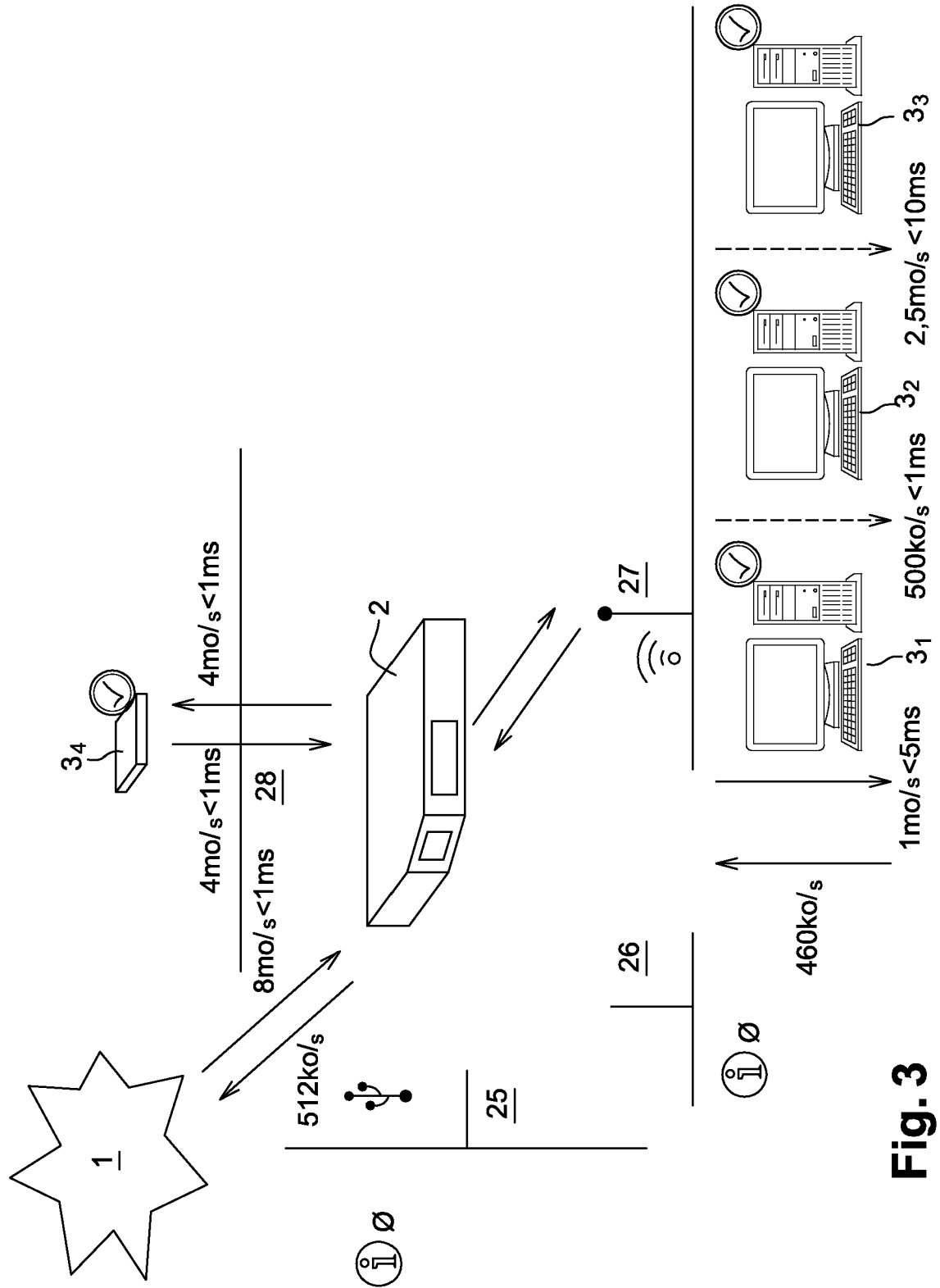

FIG. 3 illustrates an exemplary supervision interface reproduced by one of the connected terminals.

The supervision interface provides generated data comprising, in particular, at least one from among the following elements:
- the networks implemented: domestic network and, optionally, remote network 1, for example a network of an Internet access provider also named IAP;
- the router 2 with optionally these various connection technologies: USB connection technology 25, HD telephony connection technology 26, WiFi connection technology 27, Ethernet connection technology 28;
- and the connected terminals $3_1$, $3_2$, $3_3$, $3_4$, optionally distributed over the connection technologies: android terminal $3_1$, iPhone terminal $3_2$, computer terminal $3_3$ . . . connected by WiFi 27, TV decoder terminal $3_4$ connected by wired local area network (for example Ethernet . . . ), no terminals Ø on the USB connection technology 25 and HD telephony connection technology 26;
- the active streams between the router and at least one of the connected terminals symbolized in FIG. 3 by the arrows;
- the volumes of exchanges between the router and at least one of the connected terminals as regards uplink and/or downlink, in particular measured in bytes;
- the latency between the router and at least one of the connected terminals,
- the volumes of exchanges between the router 2 and the remote network 1 as regards uplink and/or downlink, in particular measured in bytes;
- the latency between the router 2 and the remote network 1, etc.

In the example of FIG. 3, the instantaneous throughputs exchanged are as follows:
- the overall throughputs (between the router and the remote network 1) are 8 mbytes/s on the downlink and 512 kbytes/s on the uplink;
- the throughputs exchanged on the domestic network with the TV decoder $3_4$ are 4 mbytes/s on the downlink and 52 kbytes/s on the uplink;
- the throughputs exchanged on the domestic network with the android TV terminal $3_1$ are 1 mbyte/s on the downlink and 460 kbytes/s on the uplink;
- the throughputs exchanged on the domestic network with the iPhone TV terminal $3_2$ are 500 kbytes/s on the downlink;
- the throughputs exchanged on the domestic network with the terminal $3_3$ are 2.5 mbytes/s on the downlink.

In the example of FIG. 3, the latencies are as follows:
- the overall latency (between the router and the remote network 1) is less than 1 ms;
- the latency on the domestic network with the TV decoder $3_4$ is less than 1 ms;
- the latency on the domestic network with the Android TV terminal $3_1$ is less than 5 ms;
- the latency on the domestic network with the iPhone TV terminal $3_2$ is less than 1 ms;
- the latency on the domestic network with the terminal $3_3$ is less than 10 ms.

The supervision interface can prompt the user of a terminal connected to the domestic network implementing the supervision interface to interact so as to trigger the timer 215 for a chosen terminal. For example, the user seeing that the latency time of the terminal $3_3$ is the highest may request a solution to a problem of slowdown experienced on the domestic network by clicking on the down arrow reproduced thereby triggering the timer 215 for at least one of the processes implemented by the terminal $3_3$ in question.

The time-delayed processes are in particular all the processes active on the terminal 33 at the moment of the user's request, or just the processes not requiring interactions by the user, or just the update processes, or processes selected subsequent to a response from the user to a dispatching to the user of the list of active processes so that he chooses either the processes which must not be time-delayed or the processes which may be time-delayed . . . . Thus, in the case where only some of the processes are time-delayed, a user of the terminal $3_3$ will not be hindered by the time-delaying of the processes that are implemented by the terminal $3_3$ since the processes with which he interacts will not be impacted at least initially. Indeed, it may be envisaged that the timer 215 attempts a resolution of the problems of loading of the domestic network step-wise, by time-delaying firstly update processes only, and then all the non-interactive processes, and only if the loading problem persists, all the processes of this terminal $3_3$.

The supervision interface can prompt the user of a terminal connected to the domestic network implementing the supervision interface to interact so as to prioritize a terminal, for example the TV decoder $3_4$, or indeed a process implemented by this terminal. Thus the timer 215 implemented automatically as a function of the origin of the detected problem will not be able to time-delay this process in particular nor indeed any process implemented by this terminal $3_4$.

The invention also envisages a medium. The information medium may be any entity or device capable of storing the program. For example, the medium may comprise a storage means, such as a ROM, for example a CD ROM or a microelectronic circuit ROM or else a magnetic recording means, for example a diskette or a hard disk.

Moreover, the information medium may be a transmissible medium such as an electrical or optical signal which may be conveyed via an electrical or optical cable, by radio or by other means. The program according to the invention may in particular be downloaded from a network especially of Internet type.

Alternatively, the information medium may be an integrated circuit in which the program is incorporated, the circuit being adapted to execute or to be used in the execution of the method in question.

In another implementation, the invention is implemented by means of software components and/or hardware components. In this regard the term module may correspond equally well to a software component or to a hardware component. A software component corresponds to one or more computer programs, one or more subprograms of a program, or more generally to any element of a program or of an item of software able to implement a function or a set of functions according to the description hereinbelow. A hardware component corresponds to any element of a hardware assembly able to implement a function or a set of functions.

Although the present disclosure has been described with reference to one or more examples, workers skilled in the art will recognize that changes may be made in form and detail without departing from the scope of the disclosure and/or the appended claims.

The invention claimed is:

1. A router of a domestic local area network able to be connected to a plurality of communication terminals and a remote network, the router comprising:
  a transmitter and a receiver configured to exchange real-time data with the plurality of communication terminals over the domestic local area network;
  a processor; and
  a non-transitory computer-readable medium comprising instructions stored thereon, which when executed by the processor configure the router to:
  monitor the real-time data exchanged with each of the plurality of communication terminals over the domestic local area network;
  implement a supervisor of resources of the domestic local area network used by at least one of the communication terminals connected to the domestic local area network on the basis of the real-time data;
  propose real-time data of use of the resources of the domestic local area network for each of the plurality of communication terminals allowing a comparison with one another and/or with overall throughputs, wherein a problem from the proposed real-time data is detected by either the supervisor and/or by way of a supervision interface, wherein the supervision interface comprises a generator of reproduction data dependent on the proposed real-time data provided by the supervisor on the basis of real-time data of use by at least one of the communication terminals; and
  at a given instant, in response to the proposed real-time data or to an input received by the router from one of the communication terminals through the supervision interface implemented by the communication terminal based on the real-time data, transmit a command to at least one of the communication terminals to postpone execution of a process by the at least one communication terminal.

2. The router of a domestic local area network as claimed in claim 1, wherein the supervisor comprises an analyzer of frames passing through the router, the analyzer determining on the basis of the frames at least real-time data of the use of the resources of the domestic local area network by at least one of the terminals connected to the router.

3. The router of a domestic local area network as claimed in claim 2, wherein the frames analyzer determines, for a frame passing through the router, the terminal exchanging the frame on the basis of an address contained by the frame.

4. The router of a domestic local area network as claimed in claim 2, wherein the frames analyzer stores on a sliding predetermined time window the real-time data of use of the resources of the domestic local area network by the at least one communication terminal.

5. The router of a domestic local area network as claimed in claim 1, wherein the supervisor comprises a collector of real-time data of use of the resources of the domestic local area network by at least one of the terminals connected to the router, the real-time data of use of the resources by the terminal originating from the terminal.

6. The router of a domestic local area network as claimed in claim 5, wherein the router comprises a service transmitter establishing a service connection with a terminal, the service connection being triggered by a communication connection of the terminal to the router, the service connection allowing the data collector to recover the real-time data of use of the resources by the terminal.

7. The router of a domestic local area network as claimed in claim 1, wherein the supervisor comprises a latency meter sending a signal of a "ping" type destined for at least one terminal connected to the router and receiving in return the signal of the "ping" type returned by the terminal allowing the meter to determine a latency of the terminal.

8. The router of a domestic local area network as claimed in claim 1, wherein the supervisor comprises a real-time aggregator of the real-time data of use of the resources of the domestic local area network by the communication terminals connected to the domestic local area network, the aggregator being configured to provide, in real time, aggregated data of use of the resources of the domestic local area network to at least one supervision interface implemented by one of the connected terminals.

9. The router of a domestic local area network as claimed in claim 1, wherein the supervisor comprises a problem detector configured to detect the problem relating to the domestic local area network triggering a search engine for searching for an origin of the problem using the real-time data of use of the resources of the network by at least one of the terminals connected to the router.

10. A communication terminal connectable to a router through a domestic local area network in connection with a remote network containing a plurality of communication terminals, the communication terminal comprising:
  a transmitter and a receiver configured to exchange real-time data with the router over the domestic local area network;
  a processor; and
  a non-transitory computer-readable medium comprising instructions stored thereon, which when executed by the processor configure the communication terminal to:
  implement a supervision interface comprising a generator of reproduction data dependent on real-time data of use of the resources of the domestic local area network by at least one of the plurality of communication terminals connected to the domestic local area network, allowing a comparison with one another and/or with overall throughputs, the reproduction data being proposed real-time data received from a network resources supervisor module of the router, a problem from the proposed real-time data being detected by the network resources supervisor module and/or by way of the supervision interface;
  receive a transmitted command from the router, at a given instant, in response to an input from a user of the communication terminal through the supervision interface that triggers the router or in response to the proposed real-time data;
  postpone execution of a process.

11. A supervision method for supervising use of a domestic local area network by a router able to be connected to a plurality of communication terminals and a remote network through the domestic local area network, the supervision method comprising the following acts performed by the router:
  exchanging real-time data with each of the plurality of communication terminals over the domestic local area network;
  monitoring the real-time data exchanged with each of the plurality of communication terminals over the domestic local area network;

implementing a supervisor of resources of the domestic local area network used by at least one of the communication terminals connected to the domestic local area network on the basis of the real-time data;

proposing real-time data of use of the resources of the domestic local area network for each of the plurality of communication terminals allowing a comparison with one another and/or with overall throughputs, wherein a problem from the proposed real-time data is detected by either the supervisor and/or by way of a supervision interface, wherein the supervision interface comprises a generator of reproduction data dependent on the real-time data provided by the supervisor on the basis of the real-time data of use by at least one of the communication terminals; and at a given instant, in response to the proposed real-time data or to an input received by the router from one of the communication terminals through the supervision interface reproduced by the communication terminal based on the real-time data, transmitting a command to at least one of the communication terminals to postpone execution of a process by the at least one communication terminal.

12. The supervision method as claimed in claim 11, wherein the supervision method comprises the supervisor implemented by the router analyzing frames passing through the router, the analyzing determining on the basis of the frames at least real-time data of use of the resources of the domestic local area network by at least one of the terminals connected to the router.

13. The supervision method as claimed in claim 11, wherein the supervision method comprises the supervisor implemented by the router detecting the problem relating to the domestic local area network triggering a search for an origin of the problem using the real-time data of use of the resources of the network by at least one of the terminals connected to the router.

14. The supervision method as claimed in claim 11, wherein the supervision method comprises postponing the execution of the process by at least one terminal connected to the router, the process executed by the terminal having been identified by the problem origin search.

15. A non-transitory computer-readable medium comprising instructions stored thereon, which when executed by a processor of a router of a domestic local area network able to be connected to a plurality of communication terminals and a remote network, configure the router to perform acts comprising:

exchanging real-time data with each of the plurality of communication terminals over the domestic local area network;

monitoring the real-time data exchanged with each of the plurality of communication terminals over the domestic local area network;

implementing a supervisor of resources of the domestic local area network used by at least one of the communication terminals connected to the domestic local area network on the basis of the real-time data;

proposing real-time data of use of the resources of the domestic local area network for each of the plurality of communication terminals allowing a comparison with one another and/or with overall throughputs, wherein a problem from the proposed real-time data is detected by either the supervisor and/or by way of a supervision interface, wherein the supervision interface comprises a generator of reproduction data dependent on the proposed real-time data provided by the supervisor on the basis of real-time data of use by at least one of the communication terminals; and at a given instant, in response to the proposed real-time data or to an input received by the router from one of the communication terminals through a supervision interface reproduced by the communication terminal based on the real-time data provided by the supervisor, transmitting a command to at least one of the communication terminals to postpone execution of a process by the at least one communication terminal.

\* \* \* \* \*